US008238386B2

(12) United States Patent
Limpert et al.

(10) Patent No.: US 8,238,386 B2
(45) Date of Patent: Aug. 7, 2012

(54) PULSED LIGHT SOURCE

(75) Inventors: Jens Limpert, Jena (DE); Andreas Tuennermann, Weimar (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 164 days.

(21) Appl. No.: 12/800,724

(22) Filed: May 21, 2010

(65) Prior Publication Data

US 2011/0286479 A1    Nov. 24, 2011

(51) Int. Cl.
*H01S 3/30*    (2006.01)
(52) U.S. Cl. .................. 372/6; 372/18; 372/25; 372/30; 372/102
(58) Field of Classification Search ................ 372/6, 25, 372/30, 18
See application file for complete search history.

(56) References Cited

U.S. PATENT DOCUMENTS 5,592,327 A * 1/1997 Gabl et al. .................... 359/348
5,847,863 A   12/1998 Galvanauskas et al.
2006/0221449 A1 10/2006 Glebov et al.
2008/0232407 A1 * 9/2008 Harter et al. ..................... 372/6
2010/0040105 A1 * 2/2010 Rocca et al. .................... 372/75

OTHER PUBLICATIONS

Fermann et al., "Self-Similar Propagation and Amplification of Parabolic Pulses in Optical Fibers," Phys. Rev. Lett. 84, 6010-6013 (2000). (Spec., p. 2).

* cited by examiner

*Primary Examiner* — Dung Nguyen
(74) *Attorney, Agent, or Firm* — Collard & Roe, P.C.

(57) ABSTRACT

It is an object of the present invention to provide a compact and low-cost system for generating ultra short high energy laser light pulses that does not use the known CPA scheme. The proposed approach is based on spectral filtering of laser light pulses of a mode locked laser source. The used mode locked laser source can be of any kind as long as its filtered residual pulse bandwidth supports pulse durations longer than 20 ps and up to 1 ns. After filtering the laser light pulses are directly amplified in an amplification element consisting of one or more amplification stages. At the same time or just after amplification the light pulses are spectrally broadened through a spectral broadening element, for example a fiber of suitably chosen core diameter and length to achieve a spectral bandwidth that is wide enough to support sub 10 ps pulses. Finally, the spectrally broadened laser light pulses are compressed by a compact dispersive element consisting of one or more Bragg gratings or a grating pair.

31 Claims, 5 Drawing Sheets

PULSED LIGHT SOURCE

FIELD OF THE INVENTION

The present invention relates to laser technology and more particularly to generating ultra short high energy laser light pulses. It is aimed to provide a compact and low-cost system that is easy to align and long-term stable.

BACKGROUND AND PRIOR ART

The generation and especially the amplification of ultra-short laser pulses with pulse durations smaller than 10 ps is limited by nonlinear effects and damage of optical components. For amplification of ultra-short laser pulses in rare-earth-doped fibers the temporal Kerr-nonlinearity, known as self-phase modulation (SPM), is the first-order and thus the dominating effect. It leads to a pulse quality degradation with increasing pulse energy. Additionally, above a critical peak power, the spatial Kerr-effect, known as self-focussing, leads to dramatic fiber damages.

A well-known approach to overcome these limitations is the chirped-pulse amplification (CPA) technique, whereby optical pulses are first temporally stretched to reduce the pulse peak power during amplification, then amplified by one or more amplification stages and finally recompressed to ultra-short pulse durations. Dispersive elements stretching the pulse duration are for example prisms, gratings, fiber Bragg gratings (FBG), volume Bragg gratings (VBG) or chirped mirrors.

Despite the given advantages, the CPA technique has some great disadvantages. These are alignment sensitivity, non-stability in the long-term-application and high costs due to the additional dispersive elements. Also, the plurality of gratings spoils the compactness of the laser system.

To overcome these disadvantages some developments have been made in the prior art.

Fermann et al. describe in their article "Self-Similar Propagation and Amplification of Parabolic Pulses in Optical Fibers" (Phys. Rev. Lett. 84, 6010-6013 (2000)) a direct amplification of ultra short laser pulses. The effects of dispersion, gain and nonlinearity (self-phase-modulation) are adapted and combined in such a way that a linearly chirped pulse with parabolic spectral and temporal intensity profile arises. However, this approach is limited by the gain bandwidth of the rare-earth doped fiber amplifier and finally by self-focussing. Pulse energies appear to be limited to about 1 µJ.

Another approach is the use of chirped fiber Bragg gratings (CFBG) as dispersive elements in fiber CPA systems, as described in U.S. Pat. No. 5,847,863. Such CFBGs reduce size and complexity of the system. However, due to excessive nonlinearity even at low energies they fail as compressor element. Thus, additional bulky compressor gratings are still needed to extract high pulse energies.

US 2006/0221449 A1 describes the use of CVBGs both as stretcher and compressor. Here, due to their large aperture, these elements are suitable for the compression of energetic pulses to ultra short duration. However, the static nature of their dispersion (fixed by design and fabrication) prohibits an adjustment to the best compression. So additional tuneable dispersive elements need to be implemented.

SUMMARY OF THE INVENTION

It is an object of the present invention to provide a compact and low-cost system for generating ultra short high energy laser light pulses that does not make use of the known CPA technique.

The approach proposed hereinafter is based on spectral filtering of laser light pulses of a mode locked laser source. The used mode locked laser source can be of any kind as long as its filtered residual pulse bandwidth supports pulse durations longer than 20 ps and up to 1 ns. After filtering the laser light pulses are directly amplified in an amplification element consisting of one or more amplification stages. At the same time or just after amplification the light pulses are spectrally broadened through a spectral broadening element, for example a fiber of suitably chosen core diameter and length to achieve a spectral bandwidth that is wide enough to support sub 10 ps pulses. Finally, the spectral broadened laser light pulses are compressed by a compact dispersive element consisting of one or more Bragg gratings or a grating pair.

In detail the invention discloses a system for generating ultra short high energy laser light pulses comprising a mode locked oscillator emitting laser light pulses, a spectral filter element stretching the pulse duration of the emitted laser light pulses, an amplification element amplifying the stretched laser light pulses, a spectral broadening element broadening the spectral bandwidth of the amplified laser light pulses and a dispersive element compressing the spectrally broadened laser light pulses.

According to the invention this system combines the advantages of using a common mode locked laser and achieving sub 10 ps pulses through the steps of stretching the pulse duration by spectral filtering, amplification, spectral broadening and finally compressing the pulse duration. The approach of the invention avoids the known chirped pulse amplification scheme (CPA) that uses dispersive elements like prisms, gratings, fiber Bragg gratings, volume Bragg gratings or chirped mirrors for stretching the light pulses before amplification.

According to a preferred embodiment of the invention a spectral filter element is made use of that comprises a switch having one input channel and a plurality of output channels directing the laser light pulses from said input channel to one of said output channels. Provision is made for a plurality of spectral filters, each having a different filter bandwidth for stretching the pulse duration of the laser light pulses, and a combiner comprising a plurality of input channels and one output channel for directing the stretched laser light pulses from said input channels to said one output channel.

According to a further preferred embodiment the spectral filter element is a spectral filter with tunable filter bandwidth. In this way, the filter bandwidth can be adjusted to obtain the desired spectrum and pulse duration.

The spectral filter element of the laser system according to the invention may comprise one or more fiber Bragg gratings, one or more interference filters or other per se known types of filters.

For obtaining sub 10 ps pulses by means of the laser system of the invention, the pulse duration of the stretched laser light pulses should be longer than 20 ps, preferably longer than 50 ps, 100 ps or even 200 ps.

In practice, the best results are obtained when the stretched laser light pulses are characterized by a time-bandwidth-product smaller than three times the transform limit.

According to yet another preferred embodiment of the invention the dispersive element compressing the spectrally broadened laser light pulses comprises multiple static compression factors. A dispersive element of this kind could be a multi channel chirped volume Bragg grating (MCVBG), that has a number of channels, each comprising a individual static compression factor.

The dispersive element of the system of the invention may additionally or alternatively comprise one or more diffraction gratings or one or more chirped volume Bragg gratings (CVBG).

The system of the invention may additionally comprise one or more pulse picking elements. The pulse picking element can be a Pockels cell or an acousto-optical modulator, by means of which pulses can be selected and therefore the pulse repetition rate can be reduced.

According to still another preferred embodiment the amplification element may comprise one or more rare-earth-doped fiber amplifiers. These fiber amplifiers are easy to handle and can easily be coupled with other fiber based elements, as discussed before. It is also possible to use fiber amplifiers in combination with bulk amplifiers.

The amplification element may also act as the spectral broadening element of the system of the invention. In that way, the number of required elements in the laser system can be reduced. The combined amplification and spectral broadening element may be for example a fiber amplifier that broadens the spectrum through self-phase-modulation in the optical fiber. Alternatively, the spectral broadening element may be an additional fiber based element, that is positioned right after the (fiber) amplification element.

For some applications it can be useful to make provision for a pulse splitting/pulse dividing element between the spectral filter element and the amplification element. Thereby, the pulse can be divided up into spectral components that are guided to different channels of the amplification element. The different channels of the amplification element may be associated with different amplification factors. This enables targeted modification of the spectrum of the light pulses.

Except the effect of self-phase-modulation no other non-linear effects should be allowed to occur in the system of the invention, especially in the spectral broadening element. To this end, the spectral broadening element may comprise filters suppressing non-linear effects other than self-phase-modulation (SPM).

Finally, the system of the invention may comprise means for improving the pulse contrast or means for frequency conversion.

BRIEF DESCRIPTION OF THE DRAWINGS

FIG. 2 shows a realized exemplary embodiment of the invention, wherein

FIG. 2 a) shows an experimental setup of a mode locked laser and a fiber Bragg grating used in combination with a fiber-optical circulator, FIG. 2 b) shows the temporal pulse profile of the stretched pulse according to FIG. 2 a);

DETAILED DESCRIPTION OF THE INVENTION

FIG. 1 represents a numerical simulation according to the invention. FIG. 1 a) shows a spectrum of a transform-limited 150 fs $sech^2$ pulse at a wavelength of 1030 nm, as it would be emitted from a mode locked laser source. FIG. 1 b) shows the spectrum of the laser pulse after passing the spectral filter element, that has a Gaussian filter profile. The resulting filtered spectrum of FIG. 1 b) has a bandwidth of 28 pm. The corresponding temporal pulse profile of the temporally stretched pulse is shown in FIG. 1 c). It exhibits a stretched pulse duration of 50 ps (FWHM). The pulse energy of these 50 ps pulses is set to 1 µJ. This is the seed pulse energy of a fiber amplifier having a mode field diameter of 50 µm and a length of 1 m. The gain of the fiber amplifier is numerically set to 4.6 1/m resulting in an output pulse energy of about 100 µJ. This pulse energy is significantly higher than that achievable by direct amplification of sub 10 ps pulses in fibers. Additionally, the corresponding pulse peak power is well below the critical peak power of self-focussing. During the amplification in the fiber amplifier the laser pulse is simultaneously broadened by self-phase-modulation (SPM) resulting in a spectral bandwidth of 1.18 nm, as shown in FIG. 1 d). Afterwards, the amplified and broadened pulse is temporally compressed by a dispersive element. In the numerical simulation according to FIG. 1 the compression is achieved by a 1740 1/mm grating pair used under Littrow condition. The temporal pulse profile of the compressed pulse is shown in FIG. 1 e) revealing a pulse duration as short as 2.2 ps (FWHM).

Figure 1A:
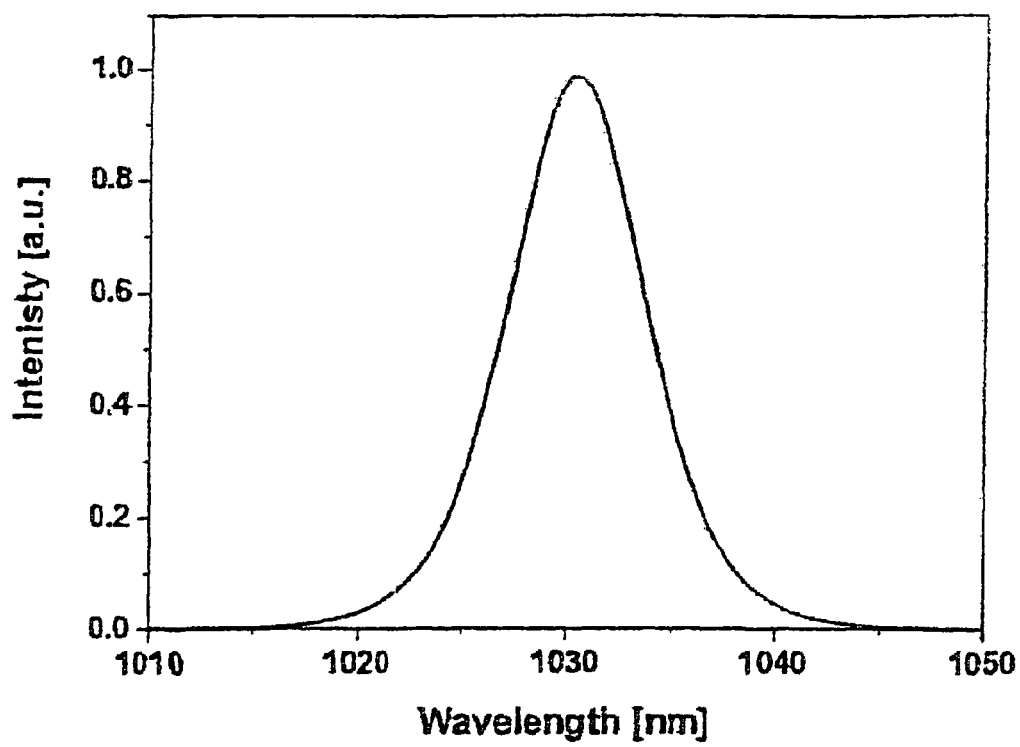
FIG. 1 shows a numerical simulation according to the system of the invention, wherein FIG. 1 a) shows a spectrum of an output pulse of a mode locked laser, FIG. 1 b) shows a spectrum of the spectrally filtered pulse, FIG. 1 c) shows a corresponding temporal pulse profile of the spectrally filtered pulse, FIG. 1 d) shows a spectrum of the amplified and broadened pulse, FIG. 1 e) shows a temporal pulse profile of the compressed pulse.
Figure 1B:
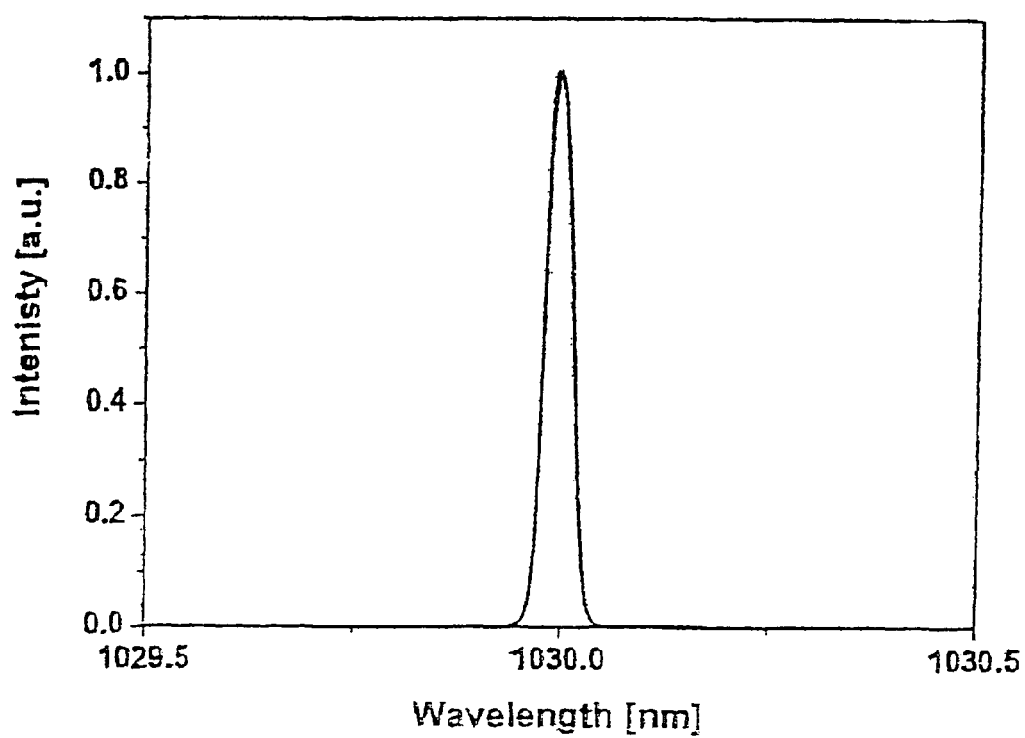
Figure 1C:
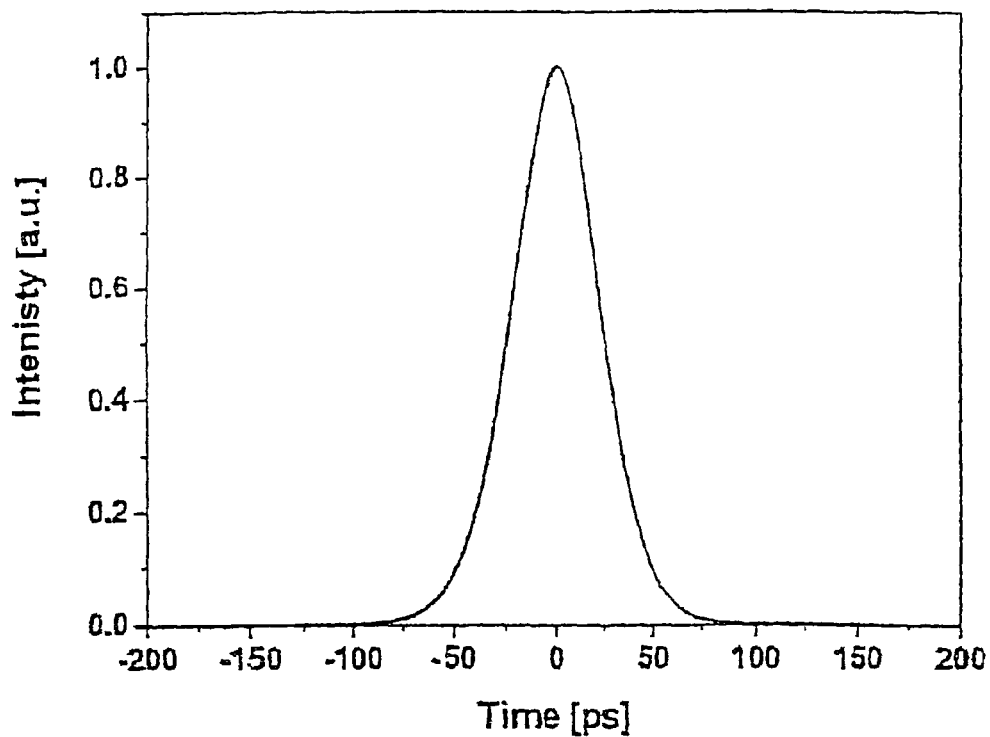
Figure 1D:
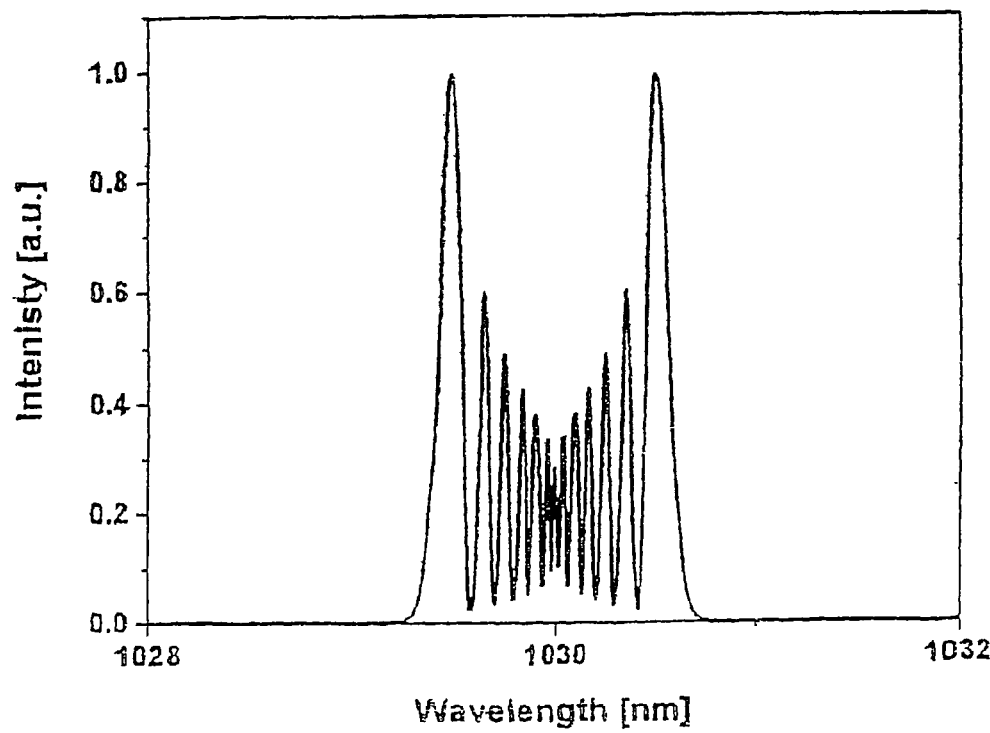
Figure 1E:
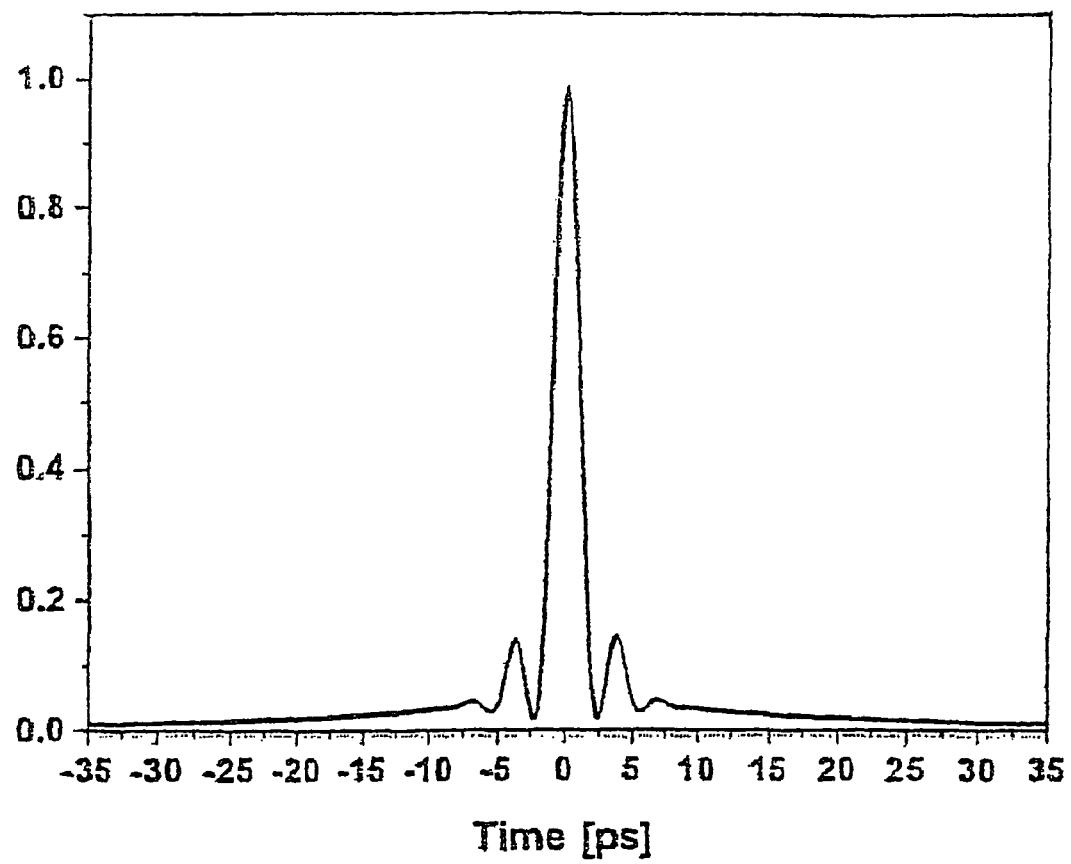
Figure 2A:
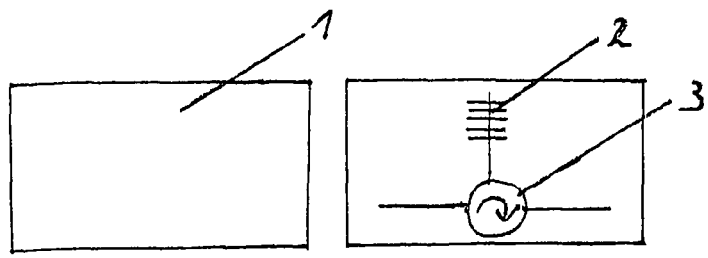
Figure 2B:
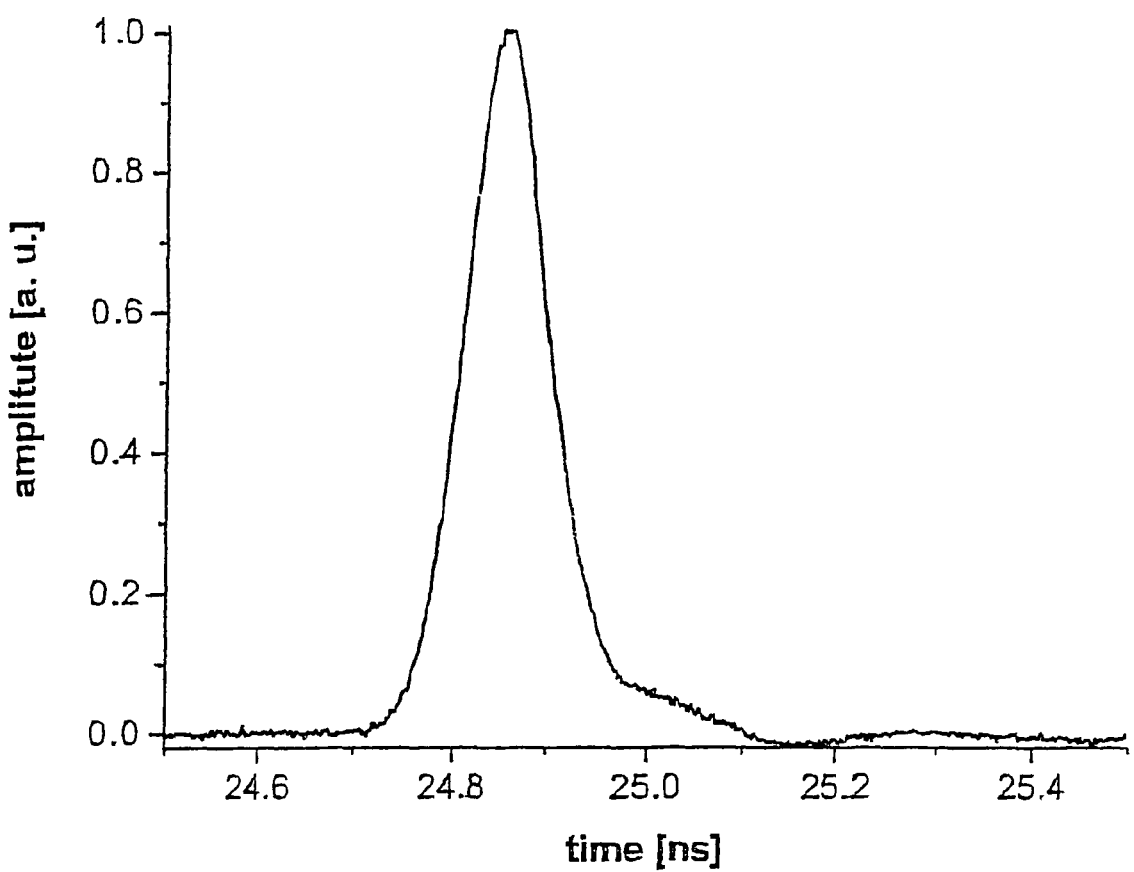

An exemplary embodiment of the invention is shown in FIG. 2. FIG. 2 a) shows a setup of a laser source 1 emitting near transform-limited pulses at a wavelength of 1030 nm. The laser source 1 is a mode locked fiber laser operating in the stretched pulse regime. The spectral emission bandwidth is as large as 10 nm and the pulse duration of the exemplarily positively chirped pulse is about 5 ps. A compression of these untreated emission pulses of the mode locked laser 1 would allow for pulse durations as short as 250 fs. According to FIG. 2 a) a narrowband fiber Bragg grating (FBG) 2 is used in combination with a fiber optical circulator 3 as spectral filter element for stretching the pulse duration of the emitted laser light pulses. The narrowband FBG 2 comprises a reflection bandwidth of about 15 pm which corresponds to a pulse duration of about 100 ps FIG. 2 b) shown the temporal pulse profile of the spectrally filtered and temporally stretched pulse measured by a diode.

Figure 3:
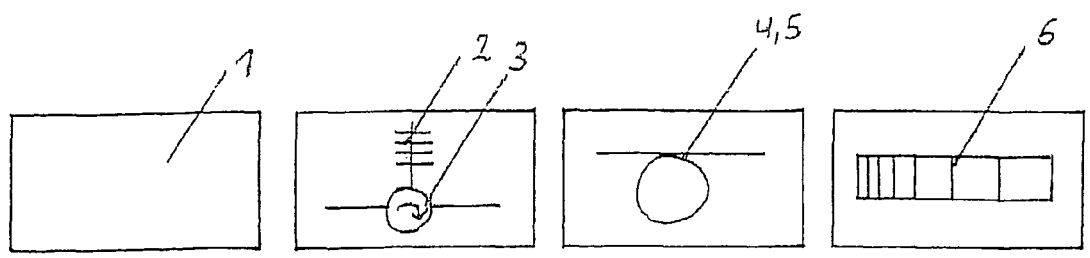
FIG. 3 shows the experimental setup of FIG. 2 a) with added fiber amplifier and pulse compressor.

FIG. 3 shows the experimental setup of FIG. 2 a) consisting of the mode locked laser 1 and the narrowband fiber Bragg grating 2 used with the fiber optical circulator 3. The spectrally filtered and temporally stretched pulse gets afterwards amplified by an amplification element 4 that is for example a rare-earth-doped fiber amplifier. The amplification element 4 can also comprise more than one fiber amplifier, especially a plurality of amplification stages. Alternatively, the amplification element 4 can comprise fiber amplifiers and additional bulk amplifiers. The amplification element 4 of FIG. 3 is a fiber amplifier with nonlinear spectral broadening by self-phase-modulation. Therefore the amplification element 4 acts simultaneously as a spectral broadening element 5. Not shown in FIG. 3 is the possibility to use an additional fiber based element as spectral broadening element 5. This additional broadening element 5 could also show self-phase-modulation. The amplified and spectrally broadened laser pulse is finally compressed by a dispersive element 6. The dispersive element 6 is a variable pulse compressor, in case of FIG. 3 *a* chirped volume Bragg grating (CVBG). Alternatively, the dispersive element 6 may also comprise more than one CVBG, one or more diffraction gratings or a multichannel chirped volume Bragg grating (MCVBG). Depending on the used dispersive element 6 it may comprise multiple static compression factors. Thereby, the compression factors can be adjusted to the needed degree of compression for achieving sub 10 ps pulses.

Figure 4:
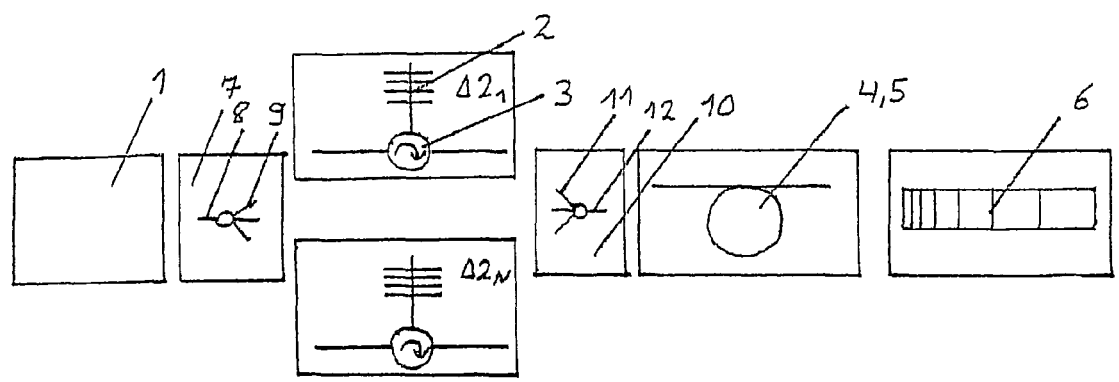
FIG. 4 shows an experimental setup for keeping the parameter "output pulse duration over spectral bandwidth" constant with changing pulse energy by use of a plurality of fiber Bragg gratings with different reflection bandwidth.

FIG. 4 shows an experimental setup for keeping the parameter (before compression) "output pulse duration over spectral bandwidth" constant with changing pulse energy by use of a plurality of fiber Bragg gratings with different reflection bandwidths. The laser light pulses of a mode locked laser 1 (a fiber based oscillator) are spectrally filtered by a spectral filter element that comprises a switch 7 with one input channel 8 and a plurality of output channels 9, a plurality of fiber Bragg gratings 2 each connected via a fiber optical circulator 3 and a combiner 10 with a plurality of input channels 11 and one output channel 12. According to the embodiment of FIG. 4, the laser light pulses of the mode locked laser 1 are guided into the input channel 8 of the switch 7. The light is divided up and fed into the output channels 9. Each output channel 9 is connected to a fiber Bragg grating 2 having a defined filter bandwidth acting as spectral filter for stretching the pulse duration in each channel. The light is then guided to an input channel 11 of the combiner 10 and re-combined into one laser light pulse leaving the combiner 10 through the output channel 12. Afterwards, the laser light pulse gets amplified and spectrally broadened through a fiber amplifier that acts simultaneously as amplification element 4 and spectral broadening element 5. Finally, the spectrally broadened laser light pulse is compressed by means of a CVBG as dispersive element 6. The so compressed laser light pulse has a pulse duration shorter than 10 ps. The plurality of spectral filters 2 can also be a plurality of filters 2 with tunable filter bandwidth. Apart from the mentioned fiber Bragg gratings 2 the spectral filter element can also comprise one or more interference filters or different types of filters. The pulse duration of the stretched laser light should be longer than 20 ps or even longer than 200 ps. This pulse duration of the stretched laser light pulse contributes to a time-bandwidth-product smaller than three times the transform limit.

Figure 5:
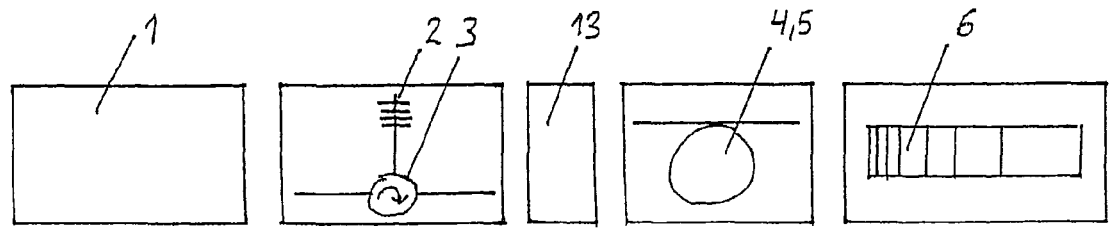
FIG. 5 shows an experimental setup for keeping the parameter "output pulse duration over spectral bandwidth" constant with changing pulse energy by use of a tunable spectral filter.

FIG. 5 shows a mode locked laser 1 that is a fiber based oscillator. It emits laser light pulses which are spectrally filtered by a tunable spectral filter 2 which is used in combination with an optical circulator 3. The tuneable spectral filter 2 comprises a tunable reflection bandwidth and can therefore be adjusted in order to obtain the desired pulse duration. After leaving the spectral filter element 2, 3 the pulse is treated by a pulse picking element 13 (which can be a Pockels-cell or an acousto-optical modulator) and then guided to the amplification element 4. The amplification element 4 is a fiber amplifier that acts simultaneously as spectral broadening element 5 through self-phase-modulation (SPM). The spectral broadening element 5 comprises spectral filters which suppress nonlinear effects other than self-phase-modulation. The dispersive element 6 in FIG. 5 is a static pulse compressor, for example a CVBG or grating pair. According to FIG. 6 the dispersive element 6 may also be a static but multiple dispersive pulse compressor, for example a multichannel CVBG.

Figure 6:
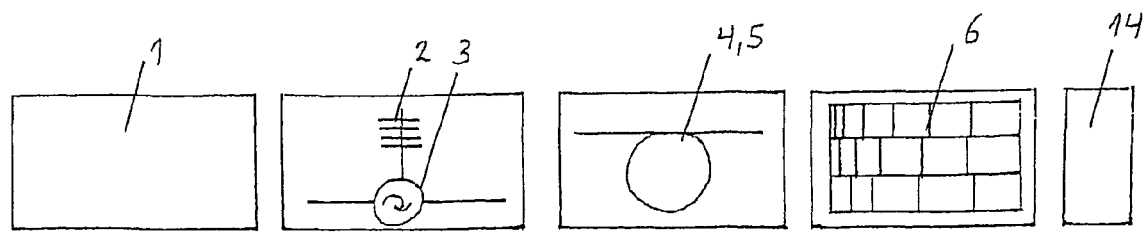
FIG. 6 shows an experimental setup for keeping the parameter "output pulse duration over spectral bandwidth" constant with changing pulse energy by use of a compressor.

In FIG. 6 the system comprises further an element 14 improving the pulse contrast after the MCVBG. The element 14 can also be located in different positions of the system.

The experimental setups according to FIGS. 3 to 6 can additionally comprise a pulse splitting element (not shown in the drawings) between the spectral filter element and the amplification element 4. This can be realised by using a multichannel switch similar to the switch 7 shown in FIG. 3.

Moreover, the experimental setups according to FIGS. 3 to 6 can comprise an element for frequency conversion (not shown in the drawings). This element can be used in different positions of the experimental setup, for example directly after the mode locked laser 1, after the spectral filter element, after the amplification element 4, or after the spectral broadening element 5.

The invention claimed is:

1. A system for generating ultra short high energy laser light pulses, comprising:
   a mode locked oscillator emitting laser light pulses,
   a spectral filter element stretching the pulse duration of the emitted laser light pulses,
   an amplification element amplifying the stretched laser light pulses,
   a spectral broadening element broadening the spectral bandwidth of the amplified laser light pulses,
   a dispersive element compressing the spectrally broadened laser light pulses.

2. The system for generating ultra short high energy laser light pulses as claimed in claim 1, wherein said spectral filter element comprises:
   a switch comprising one input channel and a plurality of output channels directing the laser light pulses from said input channel to one of said output channels,
   a plurality of spectral filters each comprising a different filter bandwidth stretching the pulse duration of the laser light pulses,
   a combiner comprising a plurality of input channels and one output channel directing the stretched laser light pulses from said input channels to said one output channel.

3. The system for generating ultra short high energy laser light pulses as claimed in claim 1, wherein said spectral filter element is a spectral filter with tunable filter bandwidth.

4. The system for generating ultra short high energy laser light pulses as claimed in claim 1, wherein said spectral filter element comprises one or more Fiber Bragg Gratings.

5. The system for generating ultra short high energy laser light pulses as claimed in claim 1, wherein the spectral filter element comprises one or more interference filters.

6. The system for generating ultra short high energy laser light pulses as claimed in claim 1, wherein the spectral filter element comprises different kinds of filters.

7. The system for generating ultra short high energy laser light pulses as claimed in claim 1, wherein the pulse duration of the stretched laser light pulses is longer than 20 ps.

8. The system for generating ultra short high energy laser light pulses as claimed in claim 1, wherein the pulse duration of the stretched laser light pulses is longer than 50 ps.

9. The system for generating ultra short high energy laser light pulses as claimed in claim 1, wherein the pulse duration of the stretched laser light pulses is longer than 100 ps.

10. The system for generating ultra short high energy laser light pulses as claimed in claim 1, wherein the pulse duration of the stretched laser light pulses is longer than 200 ps.

11. The system for generating ultra short high energy laser light pulses as claimed in claim 1, wherein the stretched laser light pulses comprise a time-bandwidth-product smaller than three times the transform limit.

12. The system for generating ultra short high energy laser light pulses as claimed in claim 1, wherein said dispersive element comprises multiple static compression factors.

13. The system for generating ultra short high energy laser light pulses as claimed in claim 12, wherein said dispersive element is a Multichannel Chirped Volume Bragg Grating (MCVBG).

14. The system for generating ultra short high energy laser light pulses as claimed in claim 1, wherein the dispersive element comprises one or more diffraction gratings.

15. The system for generating ultra short high energy laser light pulses as claimed in claim 1, wherein the dispersive element comprises one or more Chirped Volume Bragg Gratings (CVBG).

16. The system for generating ultra short high energy laser light pulses as claimed in claim 1, wherein said mode locked oscillator is a fiber based oscillator.

17. The system for generating ultra short high energy laser light pulses as claimed in claim 1, comprising at least one pulse picking element.

18. The system for generating ultra short high energy laser light pulses as claimed in claim 17, wherein the pulse picking element is a Pockels-cell or an acousto-optical modulator.

19. The system for generating ultra short high energy laser light pulses as claimed in claim 1, wherein the amplification element comprises one or more rare-earth-doped fiber amplifiers.

20. The system for generating ultra short high energy laser light pulses as claimed in claim 1, wherein the amplification element comprises fiber amplifiers and bulk amplifiers.

21. The system for generating ultra short high energy laser light pulses as claimed in claim 1, wherein the amplification element acts simultaneously as the spectral broadening element.

22. The system for generating ultra short high energy laser light pulses as claimed in claim 21, wherein the spectral broadening element comprises self-phase-modulation (SPM).

23. The system for generating ultra short high energy laser light pulses as claimed in claim 1, wherein the spectral broadening element is an additional fiber based element.

24. The system for generating ultra short high energy laser light pulses as claimed in claim 23, wherein the spectral broadening element comprises self-phase-modulation (SPM).

25. The system for generating ultra short high energy laser light pulses as claimed in claim 1, wherein the pulse duration of the compressed laser light pulses is as short as or shorter than 10 ps.

26. The system for generating ultra short high energy laser light pulses as claimed in claim 1, comprising a pulse splitting element between the spectral filter element and the amplification element.

27. The system for generating ultra short high energy laser light pulses as claimed in claim 1, wherein the spectral broadening element comprises spectral filters suppressing non-linear effects other than self-phase-modulation (SPM).

28. The system for generating ultra short high energy laser light pulses as claimed in claim 1, comprising an element improving the pulse contrast.

29. The system for generating ultra short high energy laser light pulses as claimed in claim 1, comprising frequency conversion.

30. A method for operating a system as claimed in claim 1.

31. A method for operating a system as claimed in claim 1 in material processing or laser micromachining.

\* \* \* \* \*

UNITED STATES PATENT AND TRADEMARK OFFICE
CERTIFICATE OF CORRECTION

| | |
|---|---|
| PATENT NO. | : 8,238,386 B2 |
| APPLICATION NO. | : 12/800724 |
| DATED | : August 7, 2012 |
| INVENTOR(S) | : Limpert et al. |

Page 1 of 1

It is certified that error appears in the above-identified patent and that said Letters Patent is hereby corrected as shown below:

Column 7, line 25 (Line 3 of Claim 18), change "Pockets-cell" to --Pockels-cell--.

Signed and Sealed this
Thirtieth Day of October, 2012

David J. Kappos
*Director of the United States Patent and Trademark Office*